June 4, 1935. C. E. REED 2,004,012
ROLLER CUTTER AND SPINDLE ASSEMBLY FOR EARTH BORING DRILLS
Filed July 2, 1934

INVENTOR
Clarence E. Reed
BY
Spear, Duncanson & Hall
ATTORNEY

Patented June 4, 1935

2,004,012

UNITED STATES PATENT OFFICE 2,004,012

ROLLER CUTTER AND SPINDLE ASSEMBLY FOR EARTH BORING DRILLS

Clarence E. Reed, Wichita, Kans.

Application July 2, 1934, Serial No. 734,752

25 Claims. (Cl. 255—71)

My invention relates to a roller cutter assembly for earth boring drills, and particularly to an anti-friction type of assembly using a base row of anti-friction bearings.

One object of the invention is to provide smooth, continuous, or unbroken raceway walls for the annular rows of anti-friction devices, ready assembly of the roller cutter, its spindle and the anti-friction devices and provide for taking the end thrust of the cutter by the base set of anti-friction devices in such a way that the free rolling of the cutter about its spindle will be facilitated regardless of the direction of varying thrusts as the cutter wears in service.

The invention consists in the features, combination and arrangement of the parts as will be described hereinafter and particularly defined in the claims.

Figure 1:
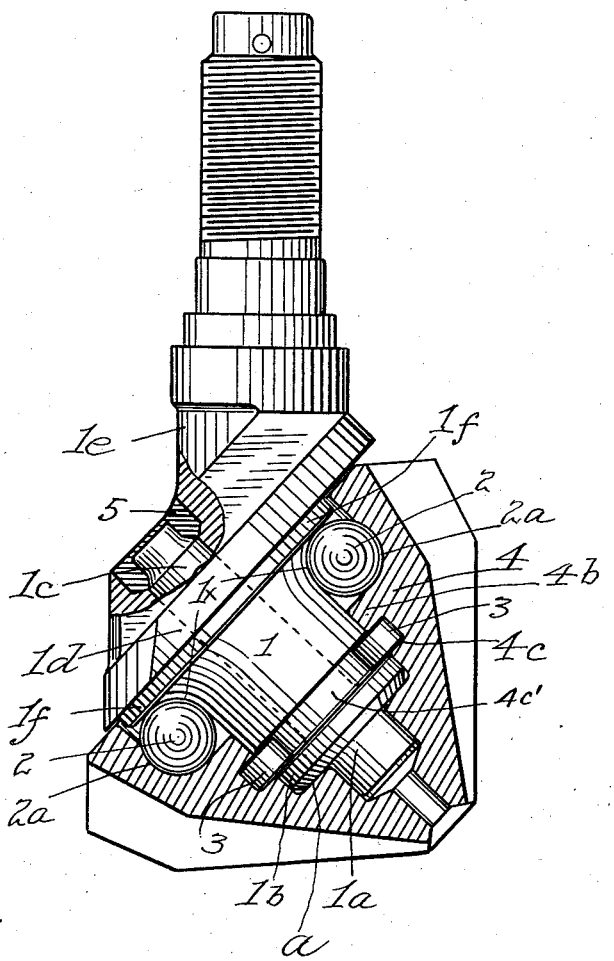
Figure 2:
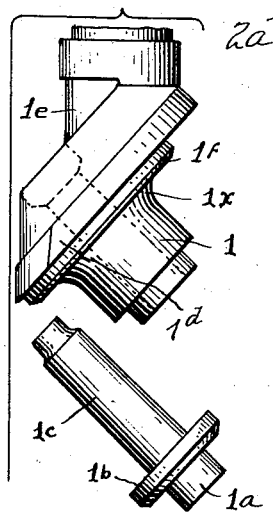

In Fig. 1 of the drawing, the invention is shown in connection with a frusto-conical cutter, said drawing showing the cutter in section and the spindle and anti-friction bearings in side elevation. Fig. 2 is a view of the spindle with its parts separated from each other.

In this drawing, 1 indicates the main part of the spindle; 2 comparatively large diameter anti-friction balls to roll on the cylindrical surface of the spindle and upon the outwardly curved part 1x of the spindle where it is integrally connected with the base plate 1d of the shank or support 1e, which, in this illustration, is intended to be affixed to or in the bit head, said shank when in position on the bit head extending vertically while the spindle inclines downwardly on an axis at right angles to the base plate, the latter being located in a plane inclined to the vertical axis of the shank or support 1e.

At 3 are shown anti-friction devices adapted to rotatively lock the roller cutter 4 onto the spindle. Said spindle is shown formed in sections. One section of the spindle is the main part 1 before mentioned, and the other part or terminal is shown at 1a, 1b. The part 1b is in the form of a flange of the same diameter as the main part of the spindle. It carries the small diameter extension forming the free end of the spindle and serving as a member for centering the frusto-conical cutter on the spindle, said centering member being of cylindrical form and affording a centering friction bearing within the apex portion of the cutter which has a bore at this point to fit said extension. The section 1b, 1a of the spindle is provided with a stem 1c extending through and fitted to the cylindrical wall of an axial opening in the main part of the spindle, said stem being welded at 5 to the spindle support 1e. The anti-friction cutter retaining members 3 are in the form of flat sided discs having a cylindrical periphery, or they may be described as short rollers.

The raceway section in the spindle receiving a part of each of these rollers of which there is an annular row, is provided by the opposing spaced apart walls of the main section 1 and end section 1b of said spindle, and the bottom of this runway section is provided by a reduced diameter integral extension on the main part of the spindle.

The other section of the raceway for these retainer discs is in the wall of the bore of the cutter, this raceway section being indicated at 4c. Its parallel side walls, like the opposing walls forming the raceway portion 4c' between the spindle sections, are spaced apart to afford bearings for the sides of the short rollers or retaining discs. The raceway 4c is formed in the wall of the cutter bore of small diameter as compared with the diameter of the bore at the end of the cutter in which the comparatively large diameter balls 2 are located. This enlarged bore opens through the base or end face of the cutter, and is of sufficiently large diameter to receive a portion 1f of the base flange 1d of the spindle support, so that the large diameter balls will find a bearing against the face of this base portion and may roll thereon as the cutter turns. The enlarged bore has therein a wide, shallow, curved groove or track indicated at 2a conforming to the periphery of the balls and forming the immediate runway in the enlarged bore of the cutter for the balls of comparatively large diameter to run in. The outwardly curved part of the spindle at 1x forms a bearing surface, opposite the track 2a, for the balls to run on.

In assembling the unit, the terminal section of the spindle is first placed within the apex portion of the cutter, the bore at this point being such that the said section when seated will have its inner side face in the same transverse plane with that one of the parallel walls of the runway 4c, which lies nearer to the apex of the cutter, which runway is to receive the short cylindrical rollers, or discs. The discs then can be placed in position in the cutter raceway 4c because the space between the stem 1c of the terminal spindle section and the wall of the bore of the cutter is sufficiently large to permit the discs to be inserted from the large diameter bore end of the cutter, and when they align with the cutter runway 4c, they are moved outwardly or radially into the same. The large diameter balls are now assembled in their raceway in the large diameter bore of the cutter, and the main spindle section is then threaded over the stem 1c and is passed through the annular row of balls and into contact at its reduced end with the terminal spindle section. The stem 1c is then welded in place at 5 and the assembly is complete.

All raceway walls are smooth and without interruptions in their surfaces so that wear of the anti-friction rollers and balls will not result from any rough spots in the raceways. This effect is rendered possible because all of the anti-friction bearings are inserted into the raceways without the use of openings in the walls thereof which must be closed by plugs, or the like.

It will be noticed that the bore of the cutter is of three diameters, the larger diameter bore being open at the end face or base of the cutter, the intermediate diameter bore being that in which the raceway 4c for the retainer discs is formed, and the smallest diameter bore being within the apex portion of the frusto-conical cutter for receiving the reduced diameter centering projection at the end of the spindle. The wall 4b of the cutter between the raceway 4c of the short rollers, or discs, and the raceway of the large diameter balls finds a friction bearing upon the main spindle section.

The construction described results in an end thrust surface at a in a plane perpendicular to the axis of the cutter, which surface bears on the end face of the terminal spindle section. These surfaces may be initially in frictional contact. The forces applied to the frusto-conical cutter tend to push the cone towards the spindle support, and the resulting end thrust may be initially taken by these contacting friction surfaces. These end thrust surfaces will wear and are not large enough in area to sustain the loads until cutter teeth wear out, and in this invention end thrust will be taken by the balls 2 of unusually large diameter, and their raceways in the enlarged bore of the cutter and on the spindle at 1x. Balls thus positioned are of large diameter and will roll freely on their raceways under thrusts that cylindrical roller bearings in similar situation will not sustain with equal efficiency, and hence the free rotation of the cutter will be permitted without braking action. All the surfaces contacted by the large balls whether on the spindle, its base flange, or on the cutter, are continuously smooth throughout. Minimum wear on the balls takes place, but most important, the balls will roll under any and all conditions of thrusts.

By reason of employing a one piece cutter and placing balls in the open bore in the base end very large balls can be employed to take both end thrust and direct drilling load, provided that, as in this invention, the use of such large balls is combined with an independent retaining means locking the cutter rotatively on the spindle, and also provided a centering friction bearing is employed therewith. This small diameter friction bearing in the apex portion of the cutter in combination with anti-friction bearings in the base end of the cutter, and roller retaining means, exerts a balancing, centering, lever action to maintain the cutter in true running relationship to the axis of the spindle, whereas, without this centering effect of a reduced friction bearing, the cutter rocks about on the double rows of anti-friction bearings and grinds off the cutting teeth similar to the well known wear of an automobile tire on a wheel out of line.

Referring to the raceway 1x this may be defined as a bearing area positioned on the spindle and its support and so disposed that every point thereof, in any plane extending along and lying in the spindle axis is equi-distant from the center of rotation of the anti-friction ball traveling on said area.

The opening through the apex of the cutter for the introduction of a tool for seating the terminal section of the spindle constitutes subject matter of application No. 697,973, filed Nov. 14, 1933.

I claim:

1. A roller cutter assembly for earth boring drills comprising a frusto-conical cutter, having a comparatively large diameter bore open at its base, with adjoining bores of progressively smaller diameter, the smallest bore being within the apex portion of the cutter, a spindle having a raceway complementary to a raceway in the bore of the cutter of intermediate diameter, anti-friction bearings in said raceway for rotatively locking the cutter on the spindle, anti-friction bearings in the form of comparatively large diameter balls positioned in the largest bore at the base of the cutter to take end thrusts outwardly from the vertical axis of rotation of the drill, and a spindle support having a portion at and extending across the open end of the large bore of the cutter, said balls rolling upon raceway surfaces in the cutter bore, on the spindle and on the said portion of the spindle support at the open end of the bore, the free end of the spindle having a reduced cylindrical extension fitting in the smallest bore of the cutter, substantially as described.

2. In a roller cutter assembly having ball bearings in an open end bore of a roller cutter, the combination of a spindle, a spindle support extending across the open end bore and having a bearing area annularly positioned at the junction of and partly on both the spindle and the spindle support, said annular area having a portion concavely curved in cross section in the plane of the axis of the spindle.

3. A roller cutter having three bores, the larger diameter bore being open at the base face of the cutter, and having therein a raceway of curved form in cross section in a plane through the cutter axis, an intermediate bore of smaller diameter than the end bore having a raceway for retainer elements and a still smaller diameter bore of cylindrical form in the cutter forming a friction bearing area.

4. A roller cutter and spindle assembly for earth boring drills comprising a one piece cutter having an enlarged bore open at one end of the cutter having therein a raceway for ball bearings which are insertable into the raceway through the open end of said bore, ball bearings in said raceway said cutter having a bore of smaller diameter adjacent the enlarged bore, with a raceway in the wall of said smaller diameter bore for anti-friction locking members to retain the roller cutter on its spindle, a spindle having a terminal section and a main section with means to hold them together, said sections having portions which provide a raceway complementary to the raceway in the smaller diameter bore of the cutter, and anti-friction locking members in the said complementary raceways of the cutter and spindle, the main spindle section being of a diameter to be inserted within the annular row of balls at the open bore of the cutter and within the smaller bore of the cutter after the insertion of the terminal section of the spindle, the locking members, and the balls into the cutter, said spindle having a support presenting a surface at the open end of the large bore of the cutter upon which the balls may roll and take end thrust, the main part of the spindle providing a raceway for said balls, substantially as described.

5. A roller cutter and spindle assembly for earth boring drills according to claim 4 in which the anti-friction locking members consist of short cylindrical rollers or discs, and the anti-friction balls which sustain the end thrust of the cutter as well as take drilling loads are of larger diameter than the diameter of the anti-friction locking discs.

6. As an article of manufacture, a spindle support and a spindle for a rolling cutter, said article having a raceway, for rolling bearings, positioned partly on the spindle support and partly on the spindle and with a concave portion conforming to the curve of the rolling bearings, a friction bearing area on the spindle between the raceway and a groove in the spindle, said spindle having a reduced diameter free end forming a bearing area.

7. A solid, one piece frusto-conical cutter having two cutting zones positioned in planes inclined to each other and a ball race in the open end bore of the base of the cutter, an annular friction bearing area next inwardly along the bore from the ball race, then a raceway having parallel sides for rolling retainer means, then another annular friction bearing area, and a reduced diameter cylindrical end bore in the apex portion of the cutter forming a friction bearing area.

8. A spindle and support for a roller cutter assembly for earth boring drills having a main section integral with the support with a ball race at the junction of the spindle with the support, said race having a part concavely curved to conform to the curve of the balls, and said race being partly on the said main spindle section and partly on the support, the surface of said spindle adjacent the ball race providing an annular friction bearing area, then an annular groove provided in part by a portion of said main section and a removable terminal spindle section having a flange providing another part of said groove, and a reduced diameter cylindrical free end.

9. A roller cutter according to claim 7 having large anti-friction balls in its open bore, supporting means for the cutter on which the balls bear to take end thrust and radial loads and rolling means for locking the cutter rotatively on its support and taking radial loads, substantially as described.

10. In a roller cutter assembly and in combination, a spindle, a spindle support to which the spindle is integrally united with a ball race partly on both the spindle and the spindle support with a curved bearing area conforming to the curve of the ball, ball bearings on said race, rolling locking means for holding the cutter on the spindle, and a roller cutter having frictional bearing on said spindle and complementary bearing surfaces for the said ball bearings and locking means, said spindle sustaining radial thrusts of said ball bearings and locking means.

11. In combination in a roller cutter assembly, a roller cutter having an open end bore, ball bearings in said open end bore, other rolling bearing and rotative locking means within the cutter bore, a spindle and spindle support having a ball raceway at the junction of the surface of said spindle with said support, said raceway having a part concavely curved to conform to the curved surface of the balls and being partly on the main portion of the spindle and partly on the support, the spindle having other annular bearing areas engaging complementary areas in the cutter bore, and a free end of the spindle extending from a shoulder on the spindle and enclosed by and bearing in the cutter.

12. In a roller cutter unit for earth boring drills and in combination, a spindle support, a spindle projecting from said support and having a free end, a roller cutter enclosing the free end of the spindle and having a bore open at its face adjacent the spindle support, ball bearings in said bore, said spindle support presenting a shoulder extending transversely of the open bore of the cutter in a plane at right angles to the axis of the spindle, said spindle and spindle support having a ball raceway at their junction with a portion thereof concavely curved to conform to the curved surface of the ball, the bore of the cutter having an annular wall in a plane substantially parallel to the face of the shoulder on the spindle support, and another wall substantially concentric with the spindle, said walls of the bore being connected by a concavely curved annular raceway conforming to the curve of the ball bearings in said bore, and roller bearings between said cutter and said spindle located between said ball bearings and the free end of the spindle, said roller bearings taking radial loads of the cutter and rotatively locking the roller cutter on the spindle.

13. In a roller cutter unit and in combination, a spindle support, a spindle having a free end, a roller cutter enclosing the free end of the spindle, and rolling bearings comprising balls positioned at the junction of and partly on both the spindle and the spindle support, said balls sustaining end thrusts and radial thrusts of the cutter, and roller bearings between said cutter and said spindle positioned towards the free end of the spindle taking radial loads of the cutter and rotatively locking said cutter on the spindle.

14. In a roller cutter unit and in combination, a spindle support, a spindle having a free end, a roller cutter enclosing the free end of the spindle, ball bearings positioned at the junction of and partly on both the spindle and the spindle support, said balls sustaining end thrusts and radial thrusts of the cutter said cutter having frictional bearing on said spindle, and means rotatively locking said cutter on the spindle.

15. A spindle for an earth boring roller cutter, composed of sections, one section having integrally formed therewith two distinct raceway portions for anti-friction bearings upon which the roller cutter may turn, and the other section being detachable at one end of the first section and having a frictional bearing area and a flanged enlargement providing a raceway portion adjacent to one of said raceway portions on the first mentioned section.

16. A roller cutter organization for earth boring drills comprising a cutter, a spindle within the cutter comprising a main section and a terminal section, a raceway partly in the cutter and partly on each of the sections of the spindle, retaining members in said raceway for holding the cutter on said spindle rotatively, said cutter having an enlarged bore open at its base face, rolling bearings in said enlarged bore, to run on the wall of said enlarged bore and on the surface of the main section of the spindle, said main section of the spindle being insertable by an axial movement within the rolling bearings and the retaining members previously inserted for holding the cutter, and a support for the spindle extending across the opening of the enlarged bore at the base face of the cutter and contacting said rolling bearings in the large diameter bore, substantially as described.

17. A roller cutter and spindle assembly for earth boring drills comprising a support, a spindle composed of a main section integral with said support, and a free end section attached to the main section opposite from said support, said main section having bearing surfaces of two rolling bearing raceways thereon, one of which is adjacent an end thereof, rolling retaining members to run on the said bearing surface of the main section adjacent one end thereof, said free end section having a surface cooperating with said adjacent end of the main section for maintaining the retaining members in operating position, a roller cutter having a raceway for the retaining members, a bore in the cutter having frictional bearing on the main section, an enlarged bore at the base of the cutter and rolling bearings in said enlarged bore contacting the other bearing surface on the main spindle section to run thereon.

18. A spindle and support for a roller cutter of an earth boring drill composed of a main section integral with said support and having a raceway for anti-friction rolling bearings adjacent the spindle support, a frictional bearing area, and a portion of another raceway for anti-friction rolling members also on the same main section, and a detachable terminal section having a portion of a raceway complemental to said portion of the other raceway on the main section.

19. A roller cutter having a comparatively large diameter bore at its base and a smaller diameter bore communicating with the large diameter bore, and with an anti-friction bearing raceway in said smaller diameter bore, in combination with a spindle having a main section with anti-friction bearings between the same and the wall of the large diameter bore, said main spindle section extending into the smaller diameter bore and providing a wall at its end complementary to one of the side walls of the said raceway of the reduced diameter bore of the cutter, a terminal spindle section having a wall complementary to the other side wall of said cutter raceway, one of said spindle sections having a cylindrical reduced diameter portion forming the bottom of a raceway in the spindle complementary to the raceway in the smaller diameter bore of the cutter, the side walls of which spindle raceway being furnished by said end wall of the main spindle section and the said wall of the terminal spindle section, substantially as described.

20. A roller cutter organization for earth boring drills comprising a cutter having a bore in the wall of which is formed an annular raceway section having its side walls in planes at right angles to the axis of the cutter, a spindle within the cutter bore having an annular raceway section in its periphery complementary to the raceway section in the wall of the cutter, and roller bearings of cylindrical disc like form substantially filling the raceway provided by the raceway sections of the spindle and cutter, and having the entire area of their flat sides contacting the side walls of the composite raceway, the spindle being composed of main and terminal sections with opposing surfaces thereof located at and forming the side walls of the spindle raceway, said cutter having a larger diameter bore at its base opening through its base face, anti-friction members in said larger bore bearing on the main spindle section, and a support for the spindle having a portion extending across the open end of the larger bore of the cutter and retaining the anti-friction bearings in said larger bore, said main spindle section having a reduced diameter cylindrical portion forming the bottom wall of the raceway in the spindle, substantially as described.

21. A roller cutter assembly for earth boring drills comprising a cutter having a plurality of cylindrical communicating bores of different diameters, a spindle on which the cutter is mounted comprising a main and a terminal section, said main section having a bearing surface forming a portion of a raceway for anti-friction bearings and having also an annular friction bearing area for a portion of the roller cutter, said main spindle section having at its end one side wall and a bottom wall of another raceway, the terminal section having a flange, the side face of which provides the other side wall of said other raceway, said terminal section having a cylindrical friction bearing area for the roller cutter, and a stem fitting within the main section of the spindle, and flat parallel sided substantially cylindrical disc shaped anti-friction members in said other raceway engaging and rotatively locking the roller cutter on the spindle, said cutter having a bore open at its base face with anti-friction bearing means therein bearing on the raceway portion first mentioned of the spindle, said cutter having within its bore a rib formation frictionally engaging the annular friction bearing area of the main spindle section, and a support for the spindle having a portion extending across the open bore of the cutter.

22. In combination in an earth boring drill, a spindle made up of a main and a terminal section, one of said sections having one side wall of a raceway section and a reduced diameter cylindrical portion forming the bottom wall of said raceway section, and the other one of said spindle sections having the opposing side wall of said raceway section, the main spindle section having thereon a portion of a raceway for anti-friction bearings in the base portion of the roller cutter, a roller cutter of frusto-conical form enclosing the spindle and having a comparatively large diameter bore in its base portion providing a raceway complementary to the raceway portion on the spindle, and having a smaller diameter bore nearer the apex of the cutter with a raceway portion therein complementary to the raceway between the main and terminal spindle sections and anti-friction bearings in the form of cylindrical members in the last mentioned raceway portions of the spindle and roller cutter, substantially as described.

23. A roller cutter and spindle organization for earth boring drills comprising a solid, one piece cutter having a bore opening through its base face, the wall of said bore providing a raceway portion for rolling bearings, said roller cutter having also a reduced diameter bore with a second raceway portion in the wall of said smaller diameter bore for rolling bearings, a spindle support and a main spindle portion integral with each other, said main spindle portion receiving all radial thrusts of two sets of rolling bearings in said raceway portions of the cutter bearing directly on said main spindle portion, one set of said rolling bearings within the smaller diameter bore of the cutter being for holding the cutter rotatably in operating position and a detachable terminal spindle portion having a flange abutting the main spindle portion and provided with a cylindrical frictional bearing area at its free end enclosed by the said cutter and having frictional bearing thereon, said terminal spindle portion cooperating with the set of rolling bearings last mentioned in holding the cutter rotatively in place.

24. In a roller cutter assembly, in combination, a spindle support, a main spindle portion integral with said support and having a bearing surface and a reduced diameter integral portion, and a detachable terminal portion adjacent the reduced diameter portion, rolling bearings on said bearing surface and roller bearings on said reduced diameter integral portion, a roller cutter on said spindle enclosing the terminal portion and bearing thereon, said cutter having two raceway portions and the cutter being rotatively held on the spindle by the roller bearings which in turn are held in position by the detachable terminal portion.

25. As an article of manufacture, a spindle and support for a roller cutter of an earth boring drill, said spindle comprising a main section integral with said support and having bearing surfaces of two rolling bearing raceways thereon, said surfaces being for receiving all radial thrusts of rolling bearings, and a detachable end section of said spindle for resisting both lateral and end thrusts of a roller cutter, said detachable end section providing a side wall of one of the said raceways.

CLARENCE E. REED.